Patented July 13, 1943

2,323,953

UNITED STATES PATENT OFFICE 2,323,953

MEAT TREATMENT

Beverly E. Williams and Leon L. Cadwell, Chicago, Ill., assignors to Industrial Patents Corporation, Chicago, Ill., a corporation of Delaware No Drawing. Application May 5, 1941,
Serial No. 391,980

6 Claims. (Cl. 99—107)

This invention relates to foods and has to do particularly with the preparation of improved fresh meat products.

An object of the invention is to prepare fresh meat in a more economical and useful manner than produced heretofore.

Another object of the invention is to provide an article of fresh meat from which the waste has been substantially eliminated and the number of servings therefrom can be easily determined.

A further object of the invention is to produce improved frozen meat items.

Also an object of the invention is to selectively prepare meat cuts having the lean and fat portions rearranged so as to prevent shrinkage in handing and to produce improved results in cooking.

It is customary in the preparation of fresh meat articles to dress the carcass and then separate it into retail or wholesale cuts by cutting the bone, fat and meat into portions of the desired size and shape. The cuts are ordinarily prepared directly from the carcass in order to dispose of the entire carcass even though a large proportion thereof is lost as bone. Moreover, the fat is not deposited by nature uniformly on the carcass but is placed in layers and masses which often constitutes waste.

In accordance with the present invention, the bones and surplus fat are removed from the cut of meat, the cut covered or wrapped with a thin layer of fat and the product frozen. It is preferable to form the boneless meat into a roll although a cut of any shape may be used.

In practicing the invention, wholesale or retail cuts of beef, lamb or veal are boned and the cuts as such or rolls thereof are covered with one or more layers of thin fat. While any thin fat layer may be used, caul fat which is a thin lace-like fat forming an outer lining of the stomach of beef, lamb and pork gives particularly good results. I prefer to use pork caul fat. The caul fat is put on warm and it is advantageous to use several layers around each cut. The caul fat being soft and pliable fits in intimate contact with the meat. The roll or cut may be secured by tying with a string at the end and at one or more places intermediate the ends.

The rolls prepared according to the invention are generally about 2 to 5 inches in diameter, about 6 to 12 inches in length and about 2 to 10 pounds in weight, although any desired shape and size may be used. Products which have been prepared commercially in this way include broiling steaks, grill steaks, pan steaks, swiss steaks, skillet steaks, sandwich steaks, salisbury steaks, roast beef, baking beef, braising beef, pot roast, boiling beef, stewing beef, beef soup meat, veal roast and lamb roast.

The boned and wrapped product is next frozen to a solid condition. Any well known method of freezing may be used. Generally, the product is frozen at temperatures of around 0° F. or below at which temperatures the freezing is rather rapid. The product may be stored for indefinite periods in the frozen condition.

The frozen product is preferably thawed before use. The frozen product may be subjected directly to cooking conditions without an intermediate thawing operation although longer cooking times are generally required. Ordinarily, the product is thawed in a cooler at temperatures around 45° F. or higher for sufficient time to secure uniform thawing or tempering throughout. About 24 hours are required for thawing at 45° F. and about 4 to 6 hours at 70° F. If the wrapped product is sliced, for example, in preparing steaks, it is desirable to do the slicing while the meat is still in a firm chill condition.

The following are typical examples of products prepared by my process:

A roast beef roll weighing about 7 to 9 pounds was prepared by removing the bone and gristle and trimming the loose pieces and excess fat from the small lean tender muscles of the top of the chuck. The muscles were well aged, formed into a roll and wrapped in one to three layers of thin fresh pork netting fat. The roll was then thoroughly frozen.

Broiling steak roll weighing about 6 to 8 pounds was made from the lean, tender steak muscle of the heart of rib and heart of short loin by removing the bone, gristle and trimming the loose pieces and excess of fat. The product, well aged, was wrapped in thin fresh pork netting fat and then frozen.

Salisbury steak roll weighing about 4 to 6 pounds is made from the small lean tender steak muscles, free from bone, gristle and excess fat. The product is chopped thoroughly, wrapped with thin, fresh pork netting and frozen.

Stewing beef, items weighing 4 to 6 pounds, may be made from rib fingers, lean leg muscles and small long muscles, containing no bone, gristle or excess fat. The muscles are arranged in strips, wrapped in fresh pork netting fat and frozen.

It has been found that by eliminating the bones and redistributing the fat a product which is more economical and useful may be obtained. For example, it has been shown that bones represent about 20%, surplus fat about 10% and gristly sinews, and so forth, about 5% of the weight of the carcass.

By boning out the individual cuts of meat and removing the surplus fat, the handling and shipping costs on about one-third of the carcass may be eliminated. The elimination of the bones, fat and waste permits the handling of only about two-thirds of the weight of the carcass. This results in a substantial saving in handling, freight and refrigeration which becomes a real economical advantage to the consumer and packer.

The wrapping of the product in caul fat makes a substantially tight seal that prevents dessication and contact with air, loss of juices and shrinkage. Also in the thawing process, leakage of juices which is common with ordinary frozen meat is absorbed and sealed in by the caul fat so that substantially all of the juices are retained in the roll for cooking. Moreover, the fat is evenly distributed over the roll whereby in cooking, the fat melts and produces uniform basting over the meat and enriches the flavor.

This application is a continuation-in-part of our copending application Serial No. 279,106, filed June 14, 1939, which has to do with a particular method of preparing boneless cuts by muscle boning. The present invention relates more broadly to the preparation of boneless and wrapped cuts regardless of the origin of the ingredients making up the boneless cut.

Obviously many modifications and variations of the invention hereinbefore set forth may be made without departing from the spirit and scope thereof, and, therefore, only such limitations should be imposed as are indicated in the appended claims.

We claim:

1. The method of preparing meat products which comprises separating the bone from the meat, wrapping the boneless meat in warm caul fat and thereafter quickly freezing the wrapped product.

2. The method of preparing fresh meat which comprises removing the bone and excess fat from the meat, wrapping the boneless meat in warm pork caul fat and thereafter rapidly freezing the wrapped product.

3. The method of preparing fresh meat which comprises removing the bone from the meat, wrapping the boneless meat in one or more layers of warm caul fat and thereafter rapidly freezing the wrapped product.

4. The method of preparing fresh meat which comprises removing the bone, wrapping the boneless meat in one to three layers of warm pork caul fat and thereafter rapidly freezing the wrapped product.

5. The method of preparing fresh meat which comprises removing the bone and excess fat from the muscles, forming the muscles into a roll, wrapping the roll with warm caul fat and thereafter rapidly freezing the wrapped roll.

6. The method of preparing fresh meat which comprises separating muscles free from bone and excess fat, forming the muscles into a roll, wrapping the roll in warm pork caul fat, quickly freezing the wrapped roll and thereafter thawing the frozen roll without removing the caul fat wrapper.

BEVERLY E. WILLIAMS.
LEON L. CADWELL.